US011707855B2

United States Patent
Tanaka

(10) Patent No.: US 11,707,855 B2
(45) Date of Patent: Jul. 25, 2023

(54) COVER FOR ROBOTS AND DETECTION SYSTEM

(71) Applicant: DENSO WAVE INCORPORATED, Chita-gun (JP)

(72) Inventor: Mitsuharu Tanaka, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 969 days.

(21) Appl. No.: 16/432,175

(22) Filed: Jun. 5, 2019

(65) Prior Publication Data

US 2019/0366563 A1 Dec. 5, 2019

(30) Foreign Application Priority Data

Jun. 5, 2018 (JP) ................. 2018-107721

(51) Int. Cl.
*B25J 19/02* (2006.01)
*B25J 19/00* (2006.01)
*B25J 9/00* (2006.01)

(52) U.S. Cl.
CPC ......... *B25J 19/0075* (2013.01); *B25J 9/0009* (2013.01); *B25J 19/021* (2013.01)

(58) Field of Classification Search
CPC ............. B25J 19/0075; B08B 17/04
USPC .......................................... 901/49
See application file for complete search history.

(56) References Cited

U.S. PATENT DOCUMENTS

| | | | | |
|---|---|---|---|---|
| 4,904,514 A | * | 2/1990 | Morrison | B25J 19/0083 428/80 |
| 7,222,727 B2 | * | 5/2007 | Aisenbrey | B65G 15/32 156/137 |
| 7,422,773 B2 | * | 9/2008 | D'Andreta | B05B 5/0533 427/427.2 |
| 10,456,931 B2 | * | 10/2019 | Bordegnoni | B25J 9/0009 |
| 10,828,791 B2 | * | 11/2020 | Fujita | B25J 19/0075 |

FOREIGN PATENT DOCUMENTS

| | | |
|---|---|---|
| CN | 1550427 A | 12/2004 |
| JP | S61-199387 U | 12/1986 |
| JP | S63-162188 A | 7/1988 |
| JP | H07-052079 A | 2/1995 |
| JP | 2002-370191 A | 12/2002 |
| JP | 2003-306217 A | 10/2003 |
| JP | 2005-199385 A | 7/2005 |
| JP | 2005-233722 A | 9/2005 |

(Continued)

*Primary Examiner* — Randell J Krug
(74) *Attorney, Agent, or Firm* — Oliff PLC

(57) ABSTRACT

Provided is a cover for an industrial robot, in which the cover does not interfere with robot movements, and ensures a fragment broken from the cover to be detected as a foreign substance, even if the fragment is mixed into a workpiece. Further provided is a detection system for detecting a fragment of the broken cover. In the robot, as an exemplary embodiment, an upper bellows cover and a lower bellows cover, which are members for enclosing a movable part of the robot, are configured to be wearable on the robot which is, for example, an industrial four-axis robot. A portion of the cover, enclosing such movable part as a shaft of the robot, is configured to be expandable, and made of a material in which a metal powder is kneaded into a substrate, which is a sheet made of rubber, resin, or elastomer.

3 Claims, 5 Drawing Sheets

(56) References Cited

FOREIGN PATENT DOCUMENTS

| | | |
|---|---|---|
| JP | 2011-031365 A | 2/2011 |
| JP | 2012-116495 A | 6/2012 |
| JP | 2016-147687 A | 8/2016 |
| JP | 2016-203264 A | 12/2016 |
| KR | 101573204 B1 * | 12/2015 |

* cited by examiner

COVER FOR ROBOTS AND DETECTION SYSTEM

CROSS-REFERENCE TO RELATED APPLICATION

This application is based on and claims the benefit of priority from earlier Japanese Patent Application No. 2018-107721 filed on Jun. 5, 2018 the description of which is incorporated herein by reference.

BACKGROUND

Technical Field

The present invention relates to a cover (or a jacket) configured to be wearable on an industrial robot having a movable part (or portion), and a detection system for detecting contamination by a broken piece of such a cover, which is mixed into a workpiece.

Related Art

Industrial robots typically include a plurality of movable parts (or portions), and grease is used for the movable parts. Although some of the grease does not harm the human body when it is adhered to or taken in by a human, grease contamination is not desirable even if it does not harm human health, since it makes consumers feel a sense of discomfort or the change in taste. Further, in the environment such as of the food industry or medical industry that requires cleanliness, the cleaning of robots is regularly performed. However, there is a concern that the cleaning is time intensive since articulations of the robots include relatively narrow gaps.

Accordingly, as described in JP-A-2012-116495, in installation of a robot, a cover may be attached to the robot in order to prevent scattering of grease or the like from the robot, that is, to prevent contamination by a foreign substance from the robot.

PATENT LITERATURES

[PTL 1] JP-A-2012-116495

However, in the actual environment, there are some issues to be solved even if contamination by a foreign substance from the robot can be prevented by attaching the cover. For example, the cover cannot have a rigid and damage resistant structure since it should not interfere with the robot changing its posture (i.e., displacements of the arm posture for designed work). As a consequence, if the cover is broken for some reasons, part of the broken cover may be contained as a foreign substance. In addition, in the field of food processing, when part of the broken cover is mixed into the workpiece such as a food product, it possibly may not be detected by visual detection means such as visual inspection or image processing.

SUMMARY

It is thus desired to provide a cover for industrial robots (simply, a robot cover), which does not interfere with the robot changing posture for designated work, and ensures a fragment of broken robot cover can be detected as a foreign substance even if it is mixed into the workpiece. It is further desired to provide a detection system for detecting a fragment of the broken robot cover as a foreign substance.

An aspect of the disclosure is a robot cover (i.e., a cover wearable on an industrial robot) configured to be wearable on a robot having a movable part, wherein a portion corresponding to the movable part is expandable, and made of a material containing a metal material. With this configuration, since the portion corresponding to (practically, enclosing or containing) the movable part is expandable, the robot cover does not interfere with the robot changing the posture. The robot cover (i.e., a cover wearable on an industrial robot) can also referred to as a robot jacket, a robot bag, or a robot enclosure (i.e., a jacket, bag or enclosure for an industrial robot).

In addition, when the robot cover is broken, a broken piece contains a metal material since it is made of a material containing a metal material. In this case, since a metal can be detected by a metal detector or the like, the broken piece can be detected even if it is scattered and attached to or mixed into the workpiece, in other words, even if it is difficult to detect by visual inspection or image processing. Accordingly, the industry can be detected as a foreign substance even if it is mixed into the workpiece without interfering with the robot changing posture.

In the above aspect of the disclosure, the material containing a metal material is a sheet of rubber, resin, or elastomer into which a metal powder is kneaded. The metal powder described herein is assumed to have a size that can be regarded as powder in terms of common general technical knowledge.

With this configuration, since the robot cover includes the substrate, which is formed by a sheet of rubber, resin, or elastomer, it is not scattered due to mere breakage. In addition, if a broken piece is scattered as a fragment (or a small piece), the metal powder is uniformly distributed in the scattered fragment since the metal powder is kneaded in the substrate, which is formed by a sheet of rubber, resin, or elastomer. In other words, the fragment scattered contains metal powder three-dimensionally distributed therein, and has a certain size.

Accordingly, although a typical metal detector cannot easily detect a thin-shaped material such as a metal foil or a material with a small projection area on the detection surface, the scattered fragment of the robot cover can be detected by a single metal detector, even if it is taken in the processed product or regardless of the orientation of the fragment, since the fragment is a mass of a certain size in which the metal powder is uniformly distributed. Therefore, the fragment can be more reliably detected.

In the above aspect of the disclosure, a portion of the robot cover corresponding to the movable part of the robot has a bellows structure. With this configuration, the robot cover can follow any change in the posture of the robot. In addition, when the robot has a straight movement portion, the robot cover is expandable following the movement of the straight movement portion, and thus does not interfere with the robot changing posture.

In the above aspect of the disclosure, the robot cover is configured to cover the entire robot except for an attachment portion to which a tool is attached. With this configuration, it is possible to cover the entire robot, which typically includes a plurality of movable parts to thereby prevent scattering of grease or the like from the robot.

In the above aspect of the disclosure, an end effector side portion of the robot is made of a material containing a metal material. In general, the end effector side portion of the robot is assumed to frequently move, and have a relatively high possibility of coming into contact with peripheral devices, that is, susceptible to damage. On the other hand, the base side portion, which is fixed, is assumed to have a relatively low possibility of being broken. Therefore, a portion susceptible to damage can be made of a material containing a metal material to thereby reduce the cost compared to the case where the entire robot cover is made of a material containing a metal material.

In the above aspect of the disclosure, the robot cover is configured to be separable at one or more positions between an end effector side portion and a base side portion of the robot. Since the end effector portion of the robot is a portion facing the workpiece, it is exposed to scattered substances from the workpiece. Further, as described above, the end effector side portion is susceptible to damage. Accordingly, the end effector side portion can be configured to be partially separable to facilitate replacement due to damage or breakage. Further, although a typical robot has a small end effector side portion and a large base side portion, the robot cover that covers the entire robot can be more easily attached since the end effector side portion is configured to be separable.

Another aspect of the disclosure is a detection system including: a robot on which a robot cover is mounted, the robot cover including a portion corresponding to a movable part, and the portion corresponding to the movable part being configured to be expandable, and made of a material containing a metal material; a metal detector provided in a production line at a position downstream from the robot; and a detection device for detecting contamination by fragment of the robot cover mixed into a workpiece on a basis of a detection result from the metal detector. With this configuration, a fragment of the robot cover that can be detected by a metal detector as described above can be detected. Further, when a metal detector is already provided in a production line, the metal detector can be used.

DETAILED DESCRIPTION OF THE PREFERRED EMBODIMENTS

Figure 1:
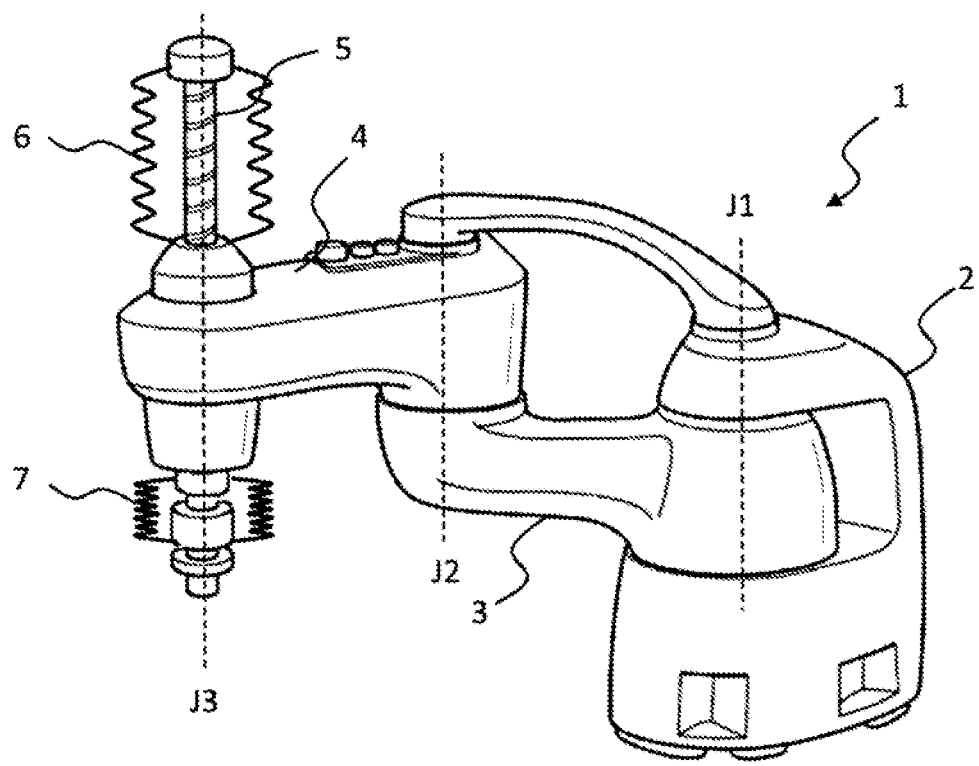
FIG. 1 is a schematic view of an example of a robot and a robot cover according to an embodiment.

With reference to the drawings, an embodiment will now be described. As shown in FIG. 1, a horizontal articulated four-axis robot 1 includes a base 2 fixed to an installation surface, a first arm 3 which is provided on the base 2 and is pivotable about a first vertical axis (J1), a second arm 4 which is provided at a distal end of the first arm 3 and is pivotable about a second vertical axis (J2), and a shaft 5 which is provided at a distal end of the second arm 4 and is vertically movable relative to the second arm 4 and rotatable about a third vertical axis (J3).

The shaft 5 is provided with an upper flange 5a and a lower flange 5b at the upper end and lower end, respectively. The shaft 5 is a ball screw spline shaft having a thread groove and a spline groove on the outer periphery, and is vertically movable by a motor, which is not shown. That is, the shaft 5 corresponds to a movable part that is movable relative to other arms in the four-axis robot 1. The first arm 3 and the second arm 4 each correspond to a movable part. Furthermore, a tool such as a hand, which is not shown, is detachably attached to a lower end 5c located on a lower end of the shaft 5. That is, the lower end 5c corresponds to an attachment portion to which a tool is attached, and also corresponds to a distal portion of the four-axis robot 1.

The upper and lower portions of the shaft 5, more specifically, portions exposed upward and downward from the second arm 4 are covered with a tubular upper bellows cover 6 and a tubular lower bellows cover 7, respectively. In FIG. 1, for simplicity of illustration, the upper bellows cover 6 and the lower bellows cover 7 are shown in cross-section. The upper bellows cover 6 and the lower bellows cover 7 each correspond to a robot cover, i.e., a cover loadable to or wearable on industrial robots.

Incidentally, the robot cover (i.e. the cover loadable to or wearable on an industrial robot) referred in the present example should be interpreted as being totally different in structures and aspects from a cover which composes surface parts of an arm body itself or a robot body itself. Such surface parts are already disclosed as an arm side cover by JPA 2011031365, which surface parts (side covers) is distinguished from the robot cover according to the present embodiment. The cover of the present embodiment according to the present invention can be detachably worn on or loaded to the robot arm or robot body, for the purpose of preventing foreign matter from coming into an object from the robot. From this point of view, the robot cover according to the present invention can be understood as a robot- or robot arm-wearable (loadable) jacket, bag, or compartment member.

Figure 2:
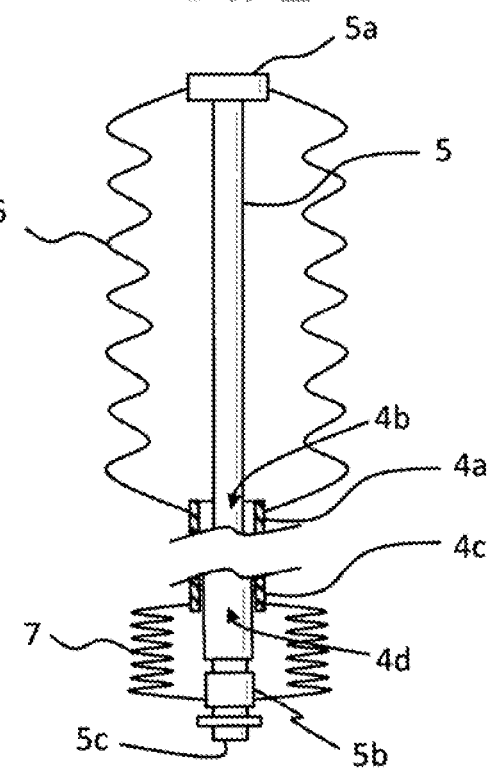
FIG. 2 is a schematic view illustrating a robot cover expanding and contracting.

As shown in FIG. 2, the upper bellows cover 6 has a tubular bellows structure, and houses the shaft 5 therein. Further, an upper end of the upper bellows cover 6 is fixed to the upper flange 5a, and a lower end is fixed to an upper wall 4a of the second arm 4. The upper wall 4a defines an upper opening 4b through which the shaft 5 is inserted and removed. Accordingly, a bellows portion of the upper bellows cover 6, which expands following the vertical movement of the shaft 5, prevents a shaft portion of the shaft 5 and the upper opening 4b of the second arm 4 through which the shaft 5 is inserted and removed from being exposed to the outside.

The lower bellows cover 7 has a tubular bellows structure, and houses the shaft 5 therein. Further, an upper end of the lower bellows cover 7 is fixed to a lower wall 4c of the second arm 4, and a lower end is fixed to the lower flange 5b. The lower wall 4c defines a lower opening 4d through which the shaft 5 is inserted and removed. Accordingly, a bellows portion of the lower bellows cover 7, which expands following the vertical movement of the shaft 5, prevents the shaft portion of the shaft 5 and the lower opening 4d of the second arm 4 through which the shaft 5 is inserted and removed from being exposed to the outside.

Each of the upper and lower bellows covers 6 and 7 is detachable from or to the arm by removing or attaching both upper and lower ends of each of the arms 6 and 7, when maintenance and repair is required. This detachable structure of the arms is true of various types of robot covers (robot-wearable covers) which will be explained later.

Figure 4:
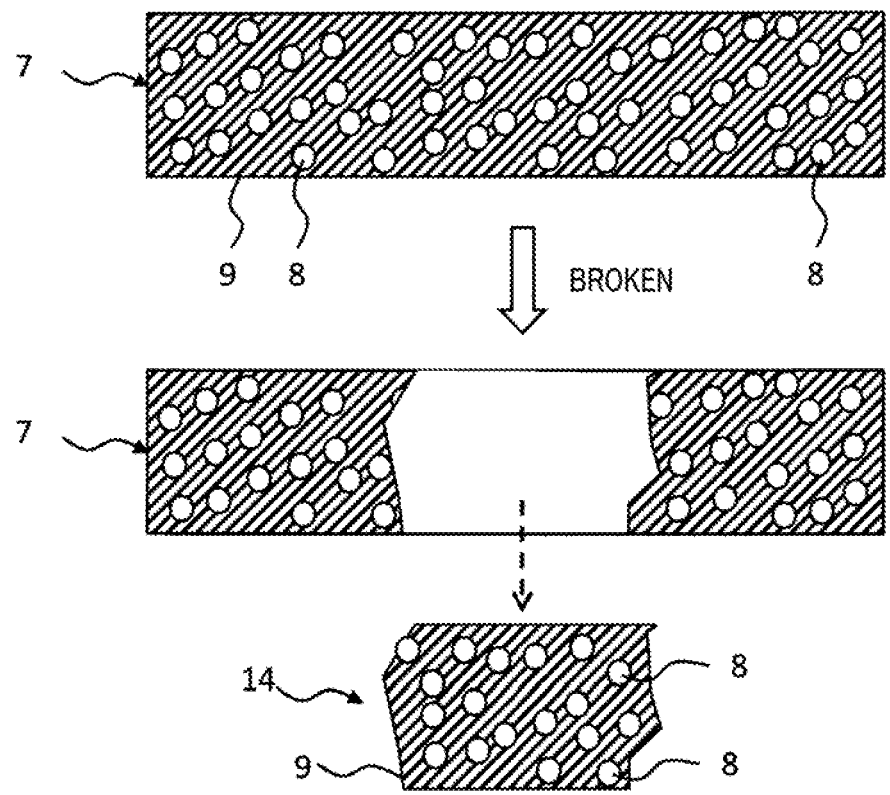
FIG. 4 is a schematic view of an example of a material used for a robot cover.

The upper bellows cover 6 and the lower bellows cover 7 are made of a material containing a metal material. Specifically, the upper bellows cover 6 and the lower bellows cover 7 are formed in a sheet-shape in which a metal powder 8 (see FIG. 4) is kneaded in a substrate 9 (see FIG. 4) made of a rubber, resin, or elastomer. That is, the upper bellows cover 6 and the lower bellows cover 7 are made of a material containing a metal material, and a portion corresponding to the movable part is configured to be expandable due to the bellows structure. In addition, the bellows structure can be formed, for example, by using common technique such as heat forming.

The amount of the metal powder 8 is set such that the metal detector 13 can detect a fragment (small piece) of the cover in which the metal powder is mixed with a cover base material and the robot arm cannot be influenced by the weight of the covers 6 and 7. The covers 6 and 7 may be colored or transparent.

Figure 3:
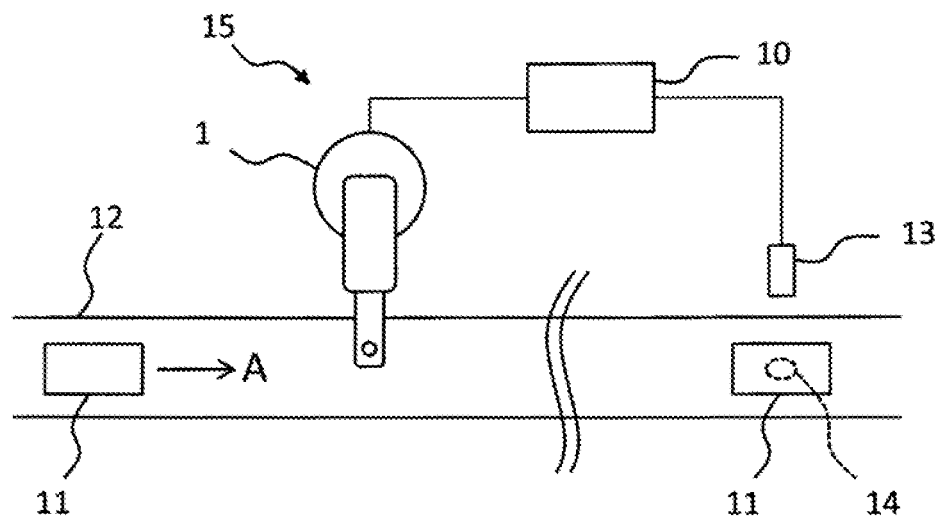
FIG. 3 is a schematic view of a configuration example of a detection system.

As shown in FIG. 3, the four-axis robot 1, which is connected to a controller 10, is installed in a production line 12 for processing workpieces 11. Although not shown in FIG. 3, the upper bellows cover 6 and the lower bellows cover 7 are wearable on the four-axis robot 1. For example, the workpiece 11 may be a food product, and is transported on the production line 12 in a direction indicated by the arrow A, during which pick-and-place operation is performed by the four-axis robot 1, by which ingredients supplied from a feeder or the like are placed on the workpiece 11.

Furthermore, a metal detector 13 is provided in the production line 12 at a position downstream from the four-axis robot 1. As is well known, the metal detector 13 is a device for detecting metal, and in the present embodiment, connected to the controller 10. The controller 10 detects contamination by a fragment 14 of the cover (see FIG. 4) mixed into the workpiece 11, that is, detects breakage of the cover on the basis of the detection result from the metal detector 13. The controller 10 corresponds to a detection device for detecting breakage of the robot cover. Further, the four-axis robot 1 on which the upper bellows cover 6 and the lower bellows cover 7 are mounted, the metal detector 13, and the controller 10 constitute a detection system 15 for detecting the fragment 14 of the robot cover.

Effects of the aforementioned configuration will now be described. Since the shaft 5 is configured to be inserted and removed from the second arm 4, there may be a case where grease or the like is attached to the shaft portion. Therefore, the shaft portion of the shaft 5 can be covered with the upper bellows cover 6 and the lower bellows cover 7 to thereby prevent the grease from being scattered from the four-axis robot 1. In the following description, the robot cover in general may be simply referred to as a cover.

In operation, an industrial robot such as the four-axis robot 1 changes its posture by rotating an arm. In this case, if the rotating arm comes into contact with a peripheral device, the cover itself may be damaged. Furthermore, in the four-axis robot 1, which is assumed to vertically move the shaft 5 in a repeated manner, aging damage may occur.

Accordingly, if part of the fragment of the broken cover is attached to the workpiece 11, it become a foreign substance. For example, in the food processing field, if part of the cover is mixed into the food product which is being processed, it cannot be detected by visual detection means such as visual inspection by an operator or image processing. Further, a fragment cannot be detected by visual inspection or optical detection means if it is mixed not only into food product but also into translucent liquid.

Therefore, in the present embodiment, the upper bellows cover 6 and the lower bellows cover 7 are formed by kneading the metal powder 8 into the substrate 9, which is a sheet of rubber, resin, or elastomer. In this case, as shown in cross-section in FIG. 4, the metal powder 8 is uniformly distributed in the substrate 9 of the lower bellows cover 7. Further, although the metal powder 8 is shown enlarged in FIG. 4 for the purpose of illustration, the metal powder 8 has a size that can be regarded as powder in terms of common general technical knowledge.

Accordingly, when the cover is partially broken and the fragment 14 is scattered, the fragment 14 contains the metal powder 8. Here, since the metal powder 8 is substantially uniformly kneaded into the substrate 9, it is considered that the metal powder 8 is three-dimensionally uniformly distributed in the scattered fragment 14.

Accordingly, such a fragment 14 can be easily detected by the metal detector 13. Although a thin-shaped material such as a metal foil cannot be easily detected by the metal detector 13, the metal powder 8, having a certain size and uniformly distributed, can be detected by a single metal detector 13 provided in the production line 12 regardless of the orientation of the fragment 14 in the workpiece 11.

In the detection system 15, even if the fragment 14 of the broken cover is attached or mixed into the workpiece 11, the fragment 14 can be detected since the metal detector 13 is provided in the production line 12 at a position downstream from the four-axis robot 1. Accordingly, breakage of the cover can be detected to thereby prevent the workpiece 11 into which a foreign substance is mixed from being transferred to a subsequent process.

According to the embodiment described above, the following effects can be achieved. The upper bellows cover 6 and the lower bellows cover 7 are robot covers configured to be wearable (or loadable) on the four-axis robot 1 having a movable part, and a portion corresponding to the movable part, the shaft 5, is configured to be expandable, and made of a material containing the metal powder 8, which is a metal material. Accordingly, when part of the robot cover is broken or tears, due to its deterioration, for example, and the fragment (small pieces) 14 is attached or mixed into the workpiece 11, the fragment 14 can be detected by the metal detector 13. Therefore, a broken piece can be detected as a foreign substance even if it is mixed into the workpiece without interfering with the four-axis robot 1 changing posture.

Furthermore, a material containing a metal material used for the robot cover is formed by kneading the metal powder 8 into the sheet-shaped substrate 9, which is made of rubber, resin, or elastomer. The substrate 9 has elasticity and thus stretchability. Since the metal powder 8 is three-dimensionally uniformly distributed in the fragment 14 of the broken part, it can be detected by the metal detector 13 regardless of the orientation of the fragment 14.

Further, in the upper bellows cover 6 and the lower bellows cover 7, which are robot covers, a portion corresponding to the movable part, the shaft 5, has a bellows structure. Accordingly, the covers can follow vertical movement of the shaft 5. In addition, in the bellows structure, there may be a case where a crack or breakage may be overlooked if it exists on the rear side relative to an operator. However, by employing a material containing a metal material, the fragment 14 can be detected by the metal detector 13 even if it is overlooked in visual inspection. Accordingly, the products contaminated by a foreign substance can be prevented from being shipped in a more reliable manner.

Furthermore, the upper bellows cover 6 and the lower bellows cover 7, which are robot covers, cover the shaft 5, which serves as a distal portion of the four-axis robot 1. That is, a distal portion of the four-axis robot 1 is made of a material containing a metal material. Accordingly, a portion that is likely to be attached or mixed into the workpiece 11 can be detectable.

Furthermore, according to the detection system 15 including: the four-axis robot 1 provided with the upper bellows cover 6 and the lower bellows cover 7, which are robot covers made of a material containing a metal material, and having a portion corresponding to the movable part, which is configured to be expandable; the metal detector 13 provided in the production line 12 at a position downstream from the four-axis robot 1; and the controller 10, which is a detection device for detecting breakage of the robot cover on the basis of the detection result from the metal detector 13, a broken piece can be detected as a foreign substance even if it is mixed into the workpiece 11 without interfering with four-axis robot 1 when changing posture.

The detection system 15 can also be applied to three major industries, that is, food, cosmetic, and pharmaceutical industries. In these industries, since the metal detector 13, which works with X-rays, magnetism, or light, is often assumed to be already provided in the production line 12 in order to detect contamination by foreign matter, the metal detector 13 can be used or shared by the detection system 15. In this case, the detection system 15 can be formed by simply attaching the robot cover to the existing robot. Accordingly, there is no need to greatly change peripheral equipment and the like, and an increase of the equipment cost can be prevented. That is, when a general-purpose robot that can accommodate various operations is installed in the environment (such as food foreign-matter inspection site) where the metal detector 13 for detecting contamination by foreign substance is provided, the robot cover of the above embodiment is particularly suitable.

Further, the robot cover is not limited to the upper bellows cover 6 and the lower bellows cover 7, but can be altered, modified, or combined as described below. In the subsequent drawings, the robot cover is shown in cross-section for simplicity of illustration.

Figure 5:
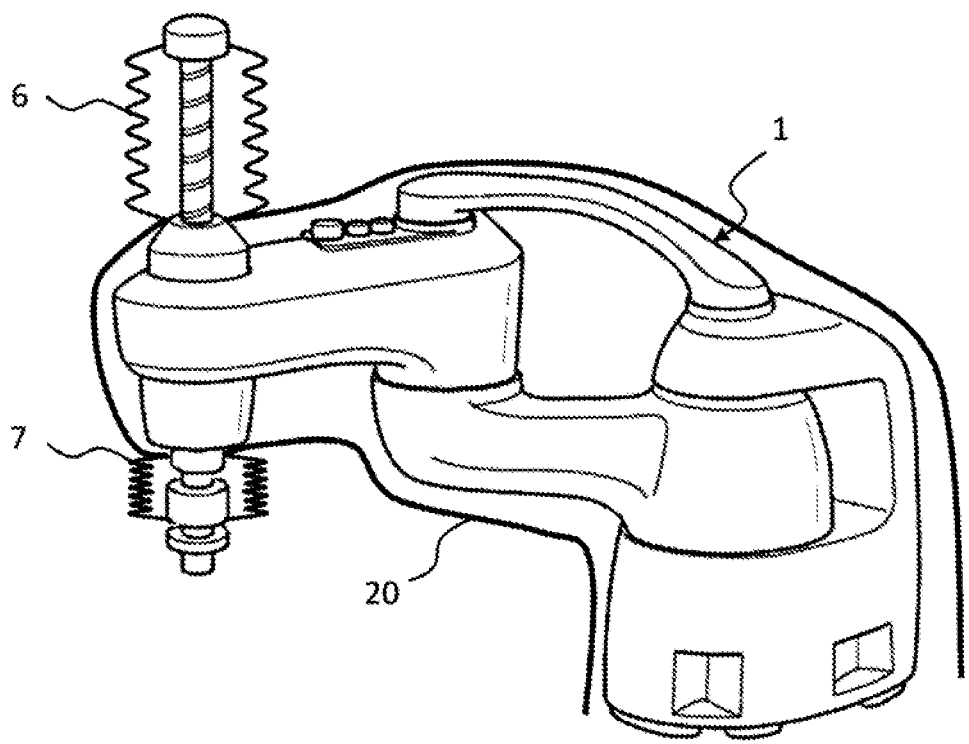
FIG. 5 is a schematic view of another configuration example of a robot cover.

For example, as shown in FIG. 5, in addition to the upper bellows cover 6 and the lower bellows cover 7, the robot cover can be formed to cover the entire four-axis robot 1 except for the attachment portion to which a tool is attached. Specifically, the robot cover can be composed of the upper bellows cover 6, the lower bellows cover 7, and an overall cover 20 that is connected to a lower end of the upper bellows cover 6 and an upper end of the lower bellows cover 7 and covers the four-axis robot 1 including the base side portion thereof. With this configuration as well, a broken piece can be detected as a foreign substance even if it is mixed into the workpiece 11 without interfering with the four-axis robot 1 changing posture.

Figure 6:
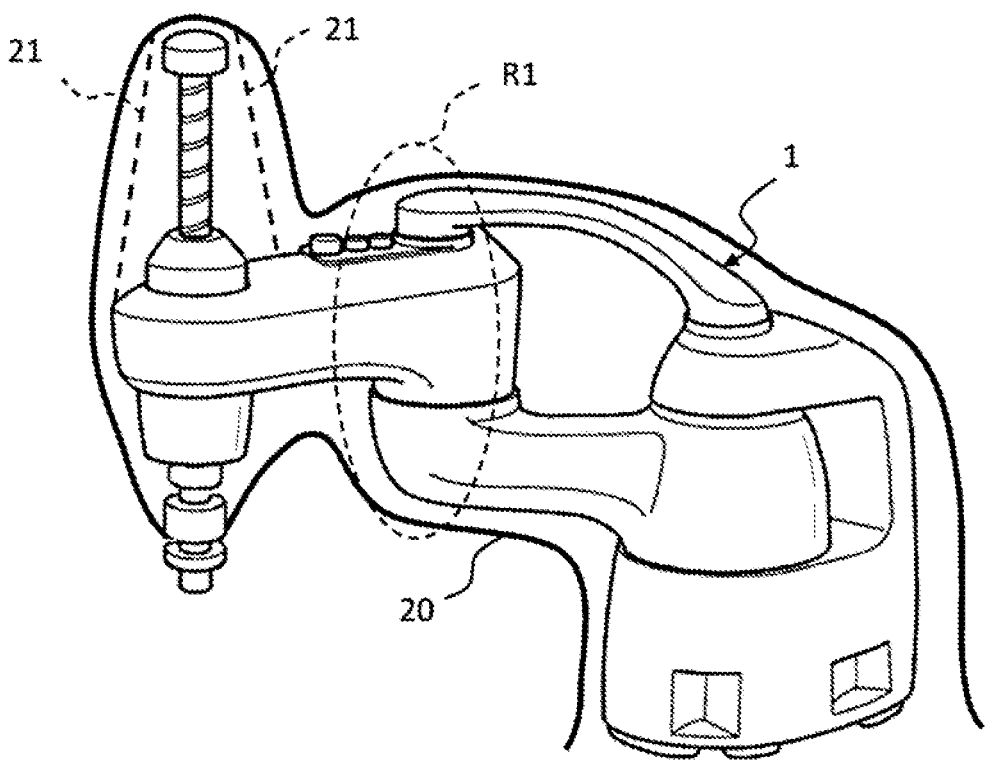
FIG. 6 is a schematic view of still another configuration example of a robot cover.

Further, as shown in FIG. 6, the overall cover 20 can be formed to cover the four-axis robot 1 including the end effector side portion thereof. In this configuration, for example, a portion (R1) corresponding to the second vertical axis (J2) can be formed as a bellows structure, or a reinforcement member 21 having a cylindrical shape can be provided around the shaft 5 to thereby ensure the range of vertical movement of the shaft 5 so that a broken piece can be detected as a foreign substance even if it is mixed into the workpiece 11 without interfering with the four-axis robot 1 changing posture. In addition, the reinforcement member 21 can be provided separately from the overall cover 20, or may be provided by forming a thickened portion in the overall cover 20.

Figure 7:
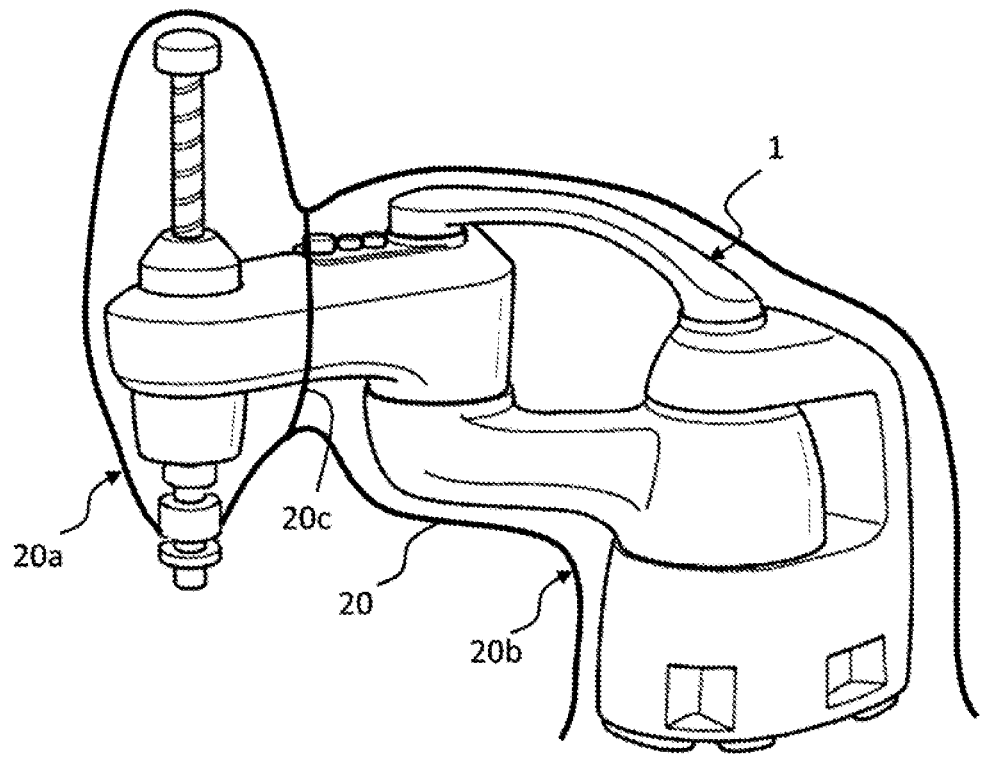
FIG. 7 is a schematic view of still another configuration example of a robot cover.

Further, as shown in FIG. 7, the overall cover 20 can be formed to be separable at one or more positions between the end effector side portion and the base side portion. In this configuration, an end effector side portion 20a and a base side portion 20b of the overall cover 20 are formed to be separable at a separation section 20c. Accordingly, a distal portion of the overall cover 20 having a relatively small diameter and a base side portion of the overall cover 20 having a relatively large diameter can be separated from each other to thereby facilitate detachment and attachment, and exchange due to breakage.

In this case, as described above, the end effector side portion 20a of the overall cover 20 can be made of a material containing a metal material, and the base side portion 20b can be made of, for example, a water repellent cloth.

Figure 8:
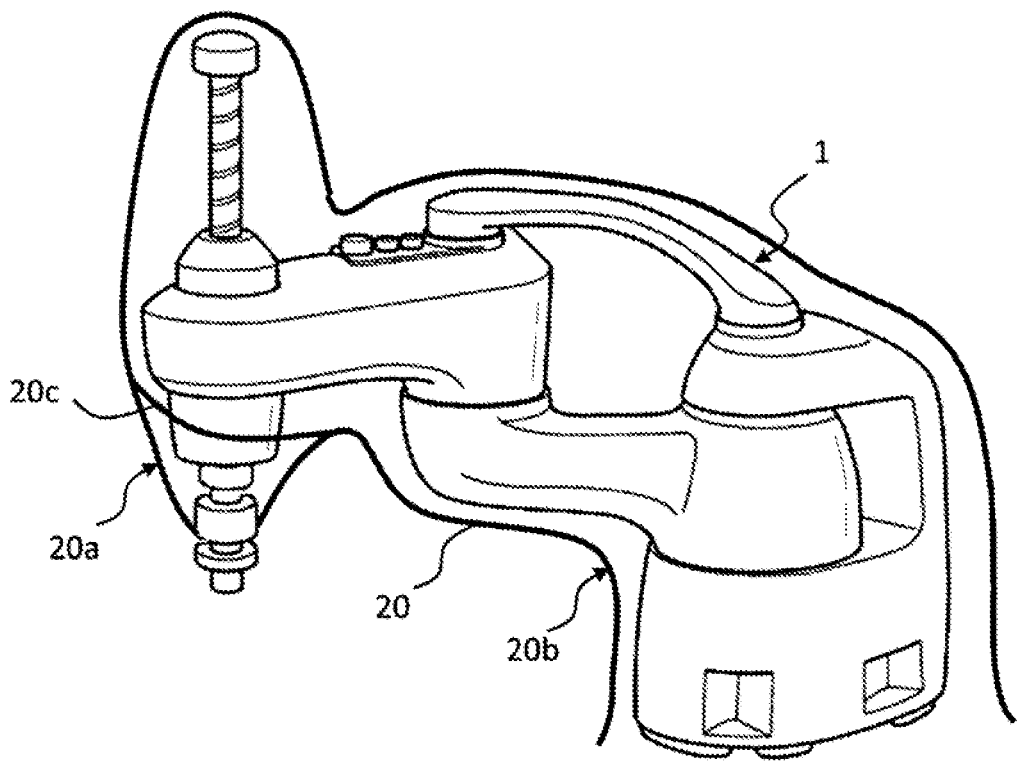
FIG. 8 is a schematic view of still another configuration example of a robot cover.

Further, as shown in FIG. 8, the separation section 20c can also be provided at a position on the underside of the second arm 4, which is on the end effector side of the four-axis robot 1 and faces the workpiece 11. Accordingly, a portion that faces the workpiece 11 and is often exposed to food or liquid, and which is assumed to be frequently replaced can be easily detached and attached to thereby improve maintenance performance.

In addition, an industrial robot to which the robot cover (or robot-wearable cover or jacket) can be applied will not be limited to the foregoing 4-axis industrial robot, but is loadable to any kind of industrial robot as long as the robot is equipped with an arm allowed to move for designated work and the arm includes a movable part or portion driven according to the designated work.

Figure 9:
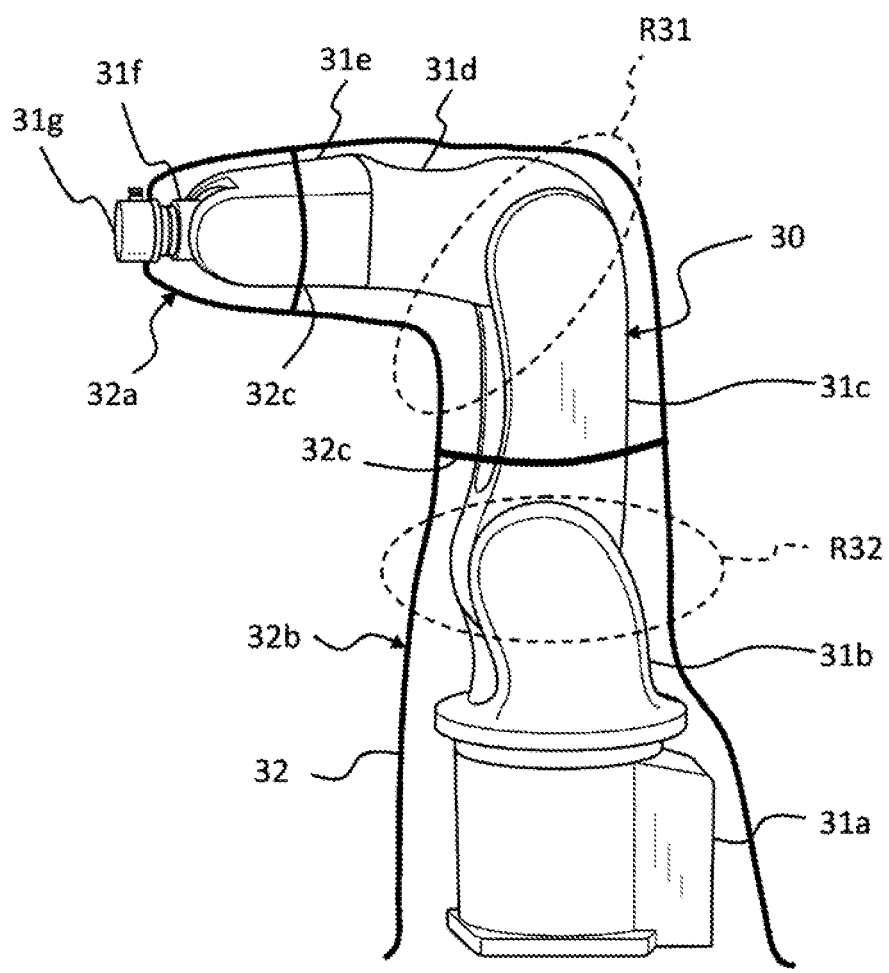
FIG. 9 is a schematic view of another configuration example of a robot and a robot cover.

For example, as shown in FIG. 9, a robot cover that entirely covers a vertical articulated six-axis robot 30 can also be provided. In the six-axis robot 30, a shoulder 31b is horizontally rotatably connected to a base 31a, and a lower arm 31c is rotatably connected to the shoulder 31b. Furthermore, a first upper arm 31d is rotatably connected to a distal end of the lower arm 31c, and a second upper arm 31e is rotatably connected to a distal end of the first upper arm 31d. Furthermore, a wrist 31f is rotatably connected a distal end of the second upper arm 31e, and a flange 31g is rotatably connected a distal end of the wrist 31f. A front surface of the flange 31g corresponds to an attachment portion of the six-axis robot 30.

Thus, an overall cover 32 is configured to cover the entire six-axis robot 30 except for the front surface of the flange 31g. In this configuration, portions (R31, R32) corresponding the articulation can be configured as a bellows structure so as not to interfere with the posture of the six-axis robot 30. In addition, an end effector side portion 32a and a base side portion 32b of the overall cover 32 can be formed to be separable at one or more separation sections 32c to thereby facilitate detachment and attachment, and partial exchange of the overall cover 32. Further, the end effector side portion 32a can be made of a material containing a metal material, while the other portions can be made of, for example, a water repellent cloth.

In this case, the robot cover such as the overall cover 32 can also be applied to a seven-axis robot, having a substantially similar configuration to the six-axis robot 30, except for the number of articulations. The material containing a metal material can also be a cloth in which metal fibers are woven. In this case, a bellows structure can be formed by providing, for example, a ring-shaped member inside the robot cover.

In the embodiments described above, the portion corresponding to the movable part is expandable due to stretchability of the cover material itself or due to having a bellows structure. However, it is also possible to provide the cover that is bent and folded back so that the folded back portion can accommodate the change in posture of the robot. The aforementioned embodiments are merely illustrative and should not be construed to limit the technical scope of the present invention.

PARTIAL REFERENCE SIGNS LIST

In the accompanying drawings:
1 four-axis robot (industrial robot)
3 first arm (example of movable part)
4 second arm (example of movable part)
5 shaft (example of movable part)
5c lower end (attachment portion)
6 upper bellows cover (example of robot cover (robot-wearable cover))
7 lower bellows cover (example of robot cover (robot-wearable cover))
8 metal powder
9 substrate
10 controller (detection apparatus, detection system)
11 workpiece
12 production line
13 metal detector (detection system)
14 fragment (small piece)
15 detection system
20 whole cover (example of robot cover (robot-wearable cover))
20a end effector side portion (example of robot cover (robot-wearable cover))
20b base side portion (example of robot cover (robot-wearable cover))
30 six-axis robot (industrial robot)
31b shoulder (example of movable part)
31c lower arm (example of movable part)
31d first upper arm (example of movable part)
31e second upper arm (example of movable part)
31f wrist (example of movable part)
31g flange (example of movable part: attachment portion)
32 overall cover (example of robot cover (robot-wearable cover))
32a end effector side portion (example of robot cover (robot-wearable cover))
32b base side portion (example of robot cover (robot-wearable cover))

What is claimed is:

1. A detection system for detecting a contamination mixed with a workpiece delivered on a production line, the detection system comprising:
an industrial robot provided with a movable arm, the movable arm having a distal end at which an end effector is attached movably by a movable part attached to the distal end, and a tool or a hand for working the workpiece being attached to the end effector,
a cover that is at least wearable on the movable part and that includes a cover portion covering the movable part, the cover portion being extendable along the movable part, and the cover being made of a material containing a metal powder such that the metal powder is uniformly distributed in the material;
a metal detector provided on the production line to which the industrial robot is installed, the metal detector being arranged at a position downstream from the robot on the production line, and the workpiece being worked with the industrial robot and delivered through a position at which the metal detected is arranged; and
a detection device configured to detect contamination mixed into or with the workpiece based on a detection result of the metal detector, the contamination being a fragment of the cover mixed into the workpiece,
wherein the cover portion has a bellows structure.

2. The detection system according to claim 1, wherein the material containing the metal powder is a sheet of rubber, resin, or elastomer into which the metal powder is kneaded.

3. A detection system for detecting a contamination mixed with a workpiece delivered on a production line, the detection system comprising:
an industrial robot provided with a movable arm, the movable arm having a distal end at which an end effector is attached movably by a movable part attached to the distal end, and a tool or a hand for working the workpiece being attached to the end effector;
a cover that is at least wearable on the movable part and that includes a cover portion covering the movable part, the cover portion being extendable along the movable part, and the cover being made of a material containing a metal powder such that the metal powder is uniformly distributed in the material;
a metal detector provided on the production line to which the industrial robot is installed, the metal detector being arranged at a position downstream from the robot on the production line, and the workpiece being worked with the industrial robot and delivered through a position at which the metal detected is arranged; and
a detection device configured to detect contamination mixed into or with the workpiece based on a detection result of the metal detector, the contamination being a fragment of the cover mixed into the workpiece,
wherein an end effector side portion of the cover, which corresponds to an end effector side of the robot, is made of a material containing the metal powder.

* * * * *